Aug. 30, 1927.

A. B. CLARK 1,640,882

SPEED CHANGE GEAR

Filed May 11, 1925

3 Sheets-Sheet 2

INVENTOR.
*Albert B. Clark;*
BY
*A. B. Upham,*
ATTORNEY.

Aug. 30, 1927.

A. B. CLARK 1,640,882

SPEED CHANGE GEAR

Filed May 11, 1925 3 Sheets-Sheet 3

INVENTOR.
Albert B. Clark;
BY
A. B. Upham,
ATTORNEY.

Patented Aug. 30, 1927.

1,640,882

UNITED STATES PATENT OFFICE.

ALBERT BURDETT CLARK, OF BOSTON, MASSACHUSETTS.

SPEED-CHANGE GEAR.

Application filed May 11, 1925. Serial No. 29,380.

The object of this invention is the construction of simplified, compact and elastic means for enabling an automobile and the like to have both its reversal and its speed changed at will.

Figure 1:
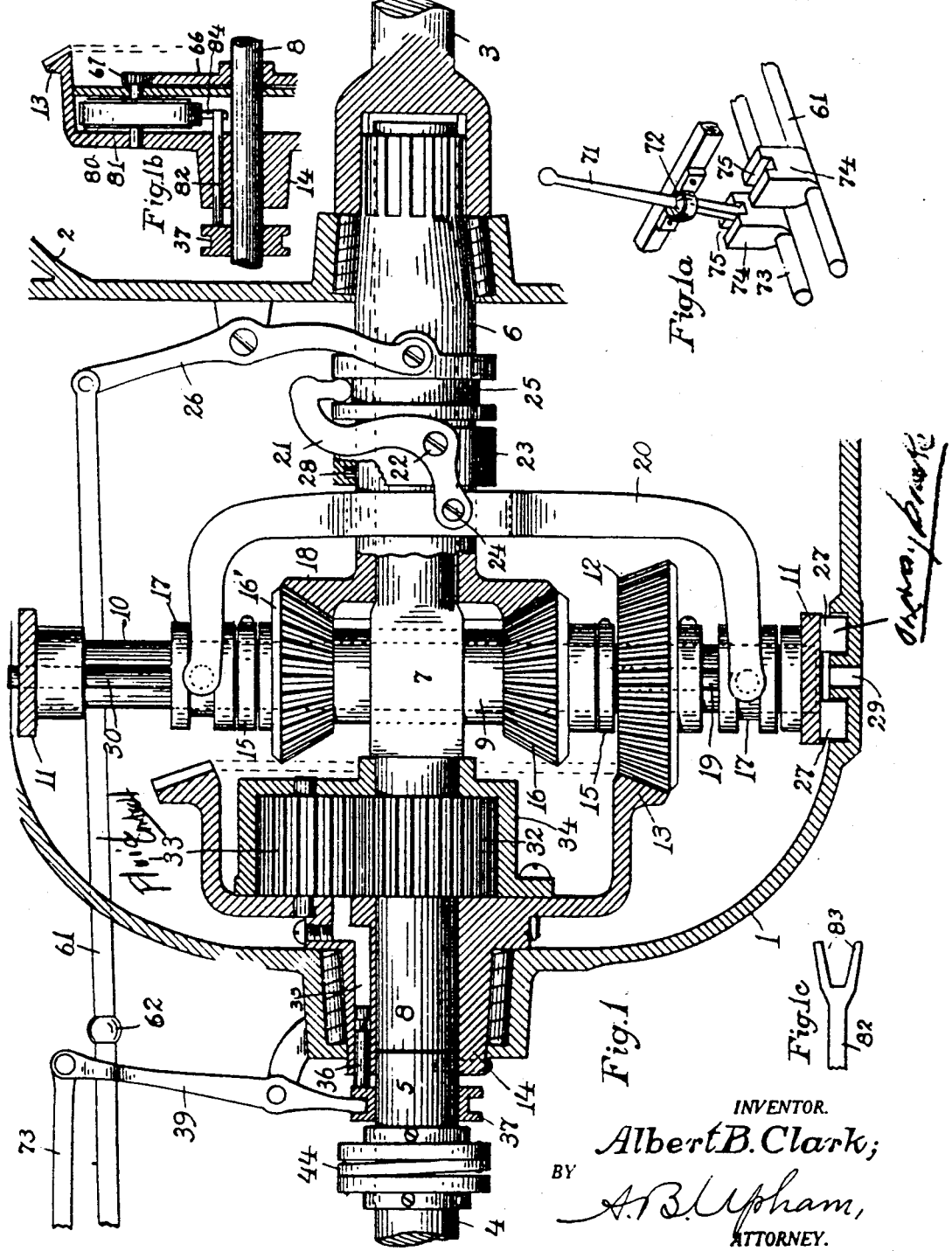
Figure 2:
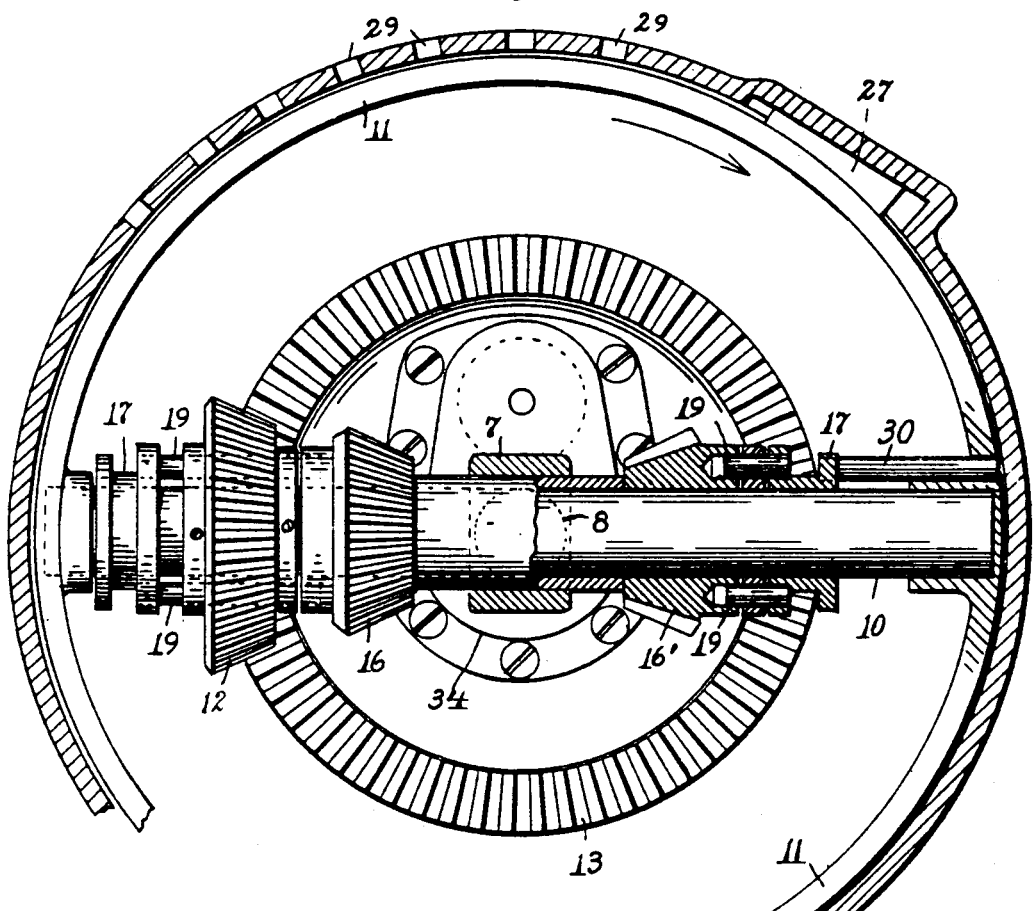
Figure 3:
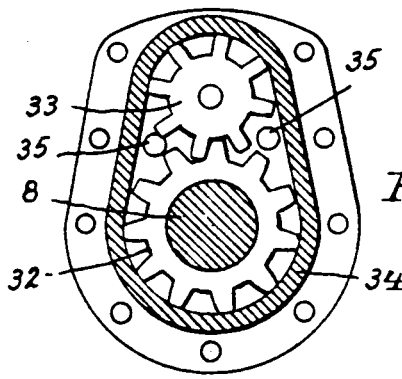
Figure 4:
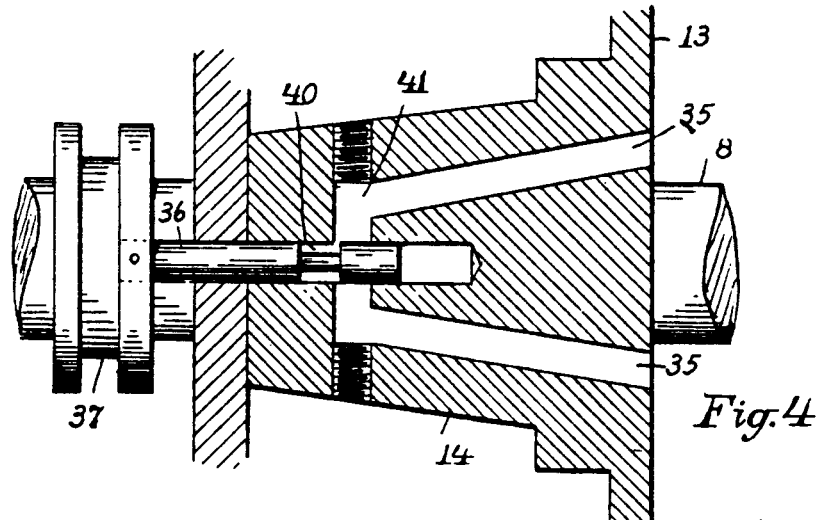
Figure 5:
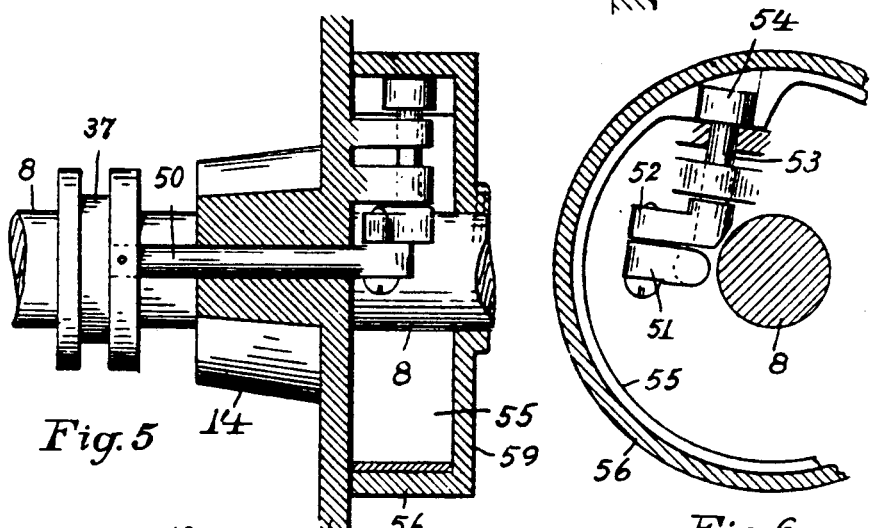
Figure 6:
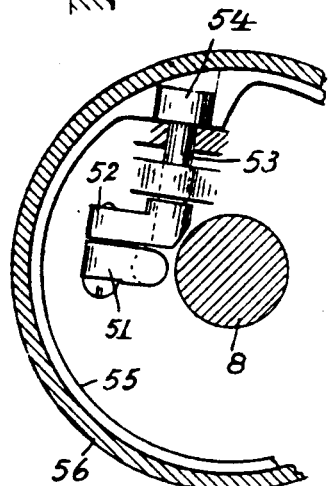
Figure 7:
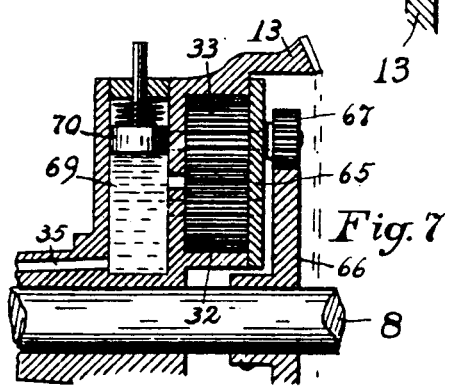

To this end I have devised the mechanism illustrated in the accompanying drawings, in which Fig. 1 is a central longitudinal section of the same. Fig. 1ª is a perspective view of the main operating lever. Fig. 1ᵇ is a sectional elevation of another form of the variable resistance means. Fig. 1ᶜ is a detail view of a part of the latter. Fig. 2 is a transverse section thereof. Fig. 3 is a detail view of the liquid resistance device. Fig. 4 is an enlarged sectional view of a part of the latter, looking from above. Fig. 5 shows another form of resistance device. Fig. 6 is an end view of the same. Fig. 7 is a sectional view of another arrangement of the liquid resistance device.

The reference numeral 1 designates the case containing my improved mechanism; and 2, the clutch case; 3 is the driving shaft receiving power from the engine through a clutch in a well known manner; and 4 is the driven shaft connected with the driving wheels. Coupled to the shaft 4 is a short shaft 5 in alinement therewith and also with the intermediate shaft 8, but disconnected from the latter. Upon the opposite terminal portion of the shaft 8 is rotatably mounted the driving sleeve 6 suitably connected with the engine shaft 3; and at an intermediate point of this shaft 8 is an enlargement 7 through which passes transversely to the shaft a fixed collar 9. Rotatable within the collar 9 is a cross shaft 10 having terminal bearings in an annulus 11, and fixed on this cross shaft is a bevel gear 12 meshing with a larger bevel gear 13 whose hub 14 is revolvable on the shaft 8 but fixed to the short shaft 5.

Loosely mounted on the cross shaft 10 at the ends of the collar 9 and held in place by collars 15, are two small bevel gears 16, 16' which mesh with a bevel gear 18 integral with or fixed to the sleeve or hub 6. Either one of these gears 16, 16' is forced at will to rotate with the cross shaft 10 by means of a grooved collar slidable thereon and having clutch pins 19 adapted to enter holes in the hubs of the gears 16, 16', as shown in Fig. 2. A spanner member 20 terminally engaging these grooved collars acts to throw either of the gears 16 or 16' into clutch with the shaft 10, but not both at the same time; the length of the pins 19 being such that when the member 20 is at mid-stroke, both pins are out of engagement with the gears.

As an automobile engine is customarily run, the bevel gear 16' is designed to give a forward motion to the driving wheels, and the gear 16 a reverse direction.

For the manipulation of the member 20, any suitable mechanism can be provided, such as the bell-crank lever 21 pivoted at 22 to a collar 23 loosely mounted on the shaft 8, and attached to the member 20 at 24; the other end of the lever 21 engaging a groove in another loosely mounted spool 25 moved along the sleeve 6 by a lever 26. While the collar 23 is rotatable upon the shaft 8, it requires to be held against longitudinal motion thereon, as by means of a pin 28 projecting from the shaft into a groove within the collar.

As shown in Fig. 2, the annulus 11 is rotatable within the gear case 1, and between the two are wedges 27, as shown in Figs. 1 and 2, which are disposed for binding and preventing the annulus from rotation on the shaft 8 in one direction, but leave it free to turn in the opposite direction. In the gear case 1 in line with the shaft 10 are holes or recesses 29 extending preferably throughout the entire periphery, although not so illustrated, which are adapted to receive the end of a pin 30 carried by the collar 17 of the gear 16', whereby when the reverse speed gear 16 is thrown into clutch and the forward gear 16' out of clutch, this pin 30 enters one of the recesses 29 and thereby locks the annulus from rotation.

Since the bevel gear 13 is loose upon the shaft 8, a frictional resistance must be provided between them in order to secure varying speed between high and low. Among these methods which I have illustrated, that shown in Figs. 1, 2 and 3 consists of a spur gear 32 fixed upon the shaft 8 meshing with another spur gear 33 rotatably carried by and both snugly encased in a jacket 34, as in Figs. 1 and 3. Through the hub 14 of the gear 13 are two passages 35 opening from opposite sides of the point of meshing of the gears, as indicated in Fig. 3; the other ends of these passages being put in communication by a cross-passage 41, but controlled by a pin 36 moved by a grooved collar 37 and lever 39; this pin having an annular groove 40 which permits of circulation of the heavy oil or other liquid filling the jacket 34. By sliding this pin to put the groove 40 more or less out of line with the cross-passage 41, the resistance to relative rotation of the two gears 32, 33 is varied at will.

By moving the pin 36 to shut off all circulation of the heavy liquid, and the gear 16' being in clutch with the shaft 10, the shaft 8 must rotate with the gear 13 and hence with the short shaft 5 and driven shaft 4, and the full speed of the engine will be delivered to the drive wheels.

Instead of having the spur gear 32 mounted directly upon the shaft 8, it may be separate therefrom and geared thereto, as is more fully described hereinafter.

In another form of resistance means is that of a friction brake, as shown in Figs. 5 and 6. Here the grooved collar 37 is connected by a slender rod 50 reaching through the hub 14 to a point within the bevel gear 13, where it is provided with an elbow 51 loosely pivoted to a crank arm 52 fixed on the shaft 53. On this shaft is a cam 54 turning between the ends of an expansion brake 55 and thereby pressed into braking action with the flange 56 which is carried by a disk 59 fast on the shaft 8. By changing the inward pressure applied to the rod 50, the relative rotation of the gear 13 and shaft 8 is varied accordingly.

The operation of the change speed mechanism is as follows: Power is communicated from the engine through the shaft 3 and sleeve 6 to the bevel gear 18 and which is always in mesh with the two bevel gears 16, 16'. Hence when the spanner member 20 is shifted to the position illustrated in Fig. 1, then the gear 16' is the one which will cause the shaft to rotate, since that is the one in clutch. This tends to make the bevel gear 12 rotate the gear 13; but, since the pin 30 is now out of engagement with any recess 29 in the gear case 1, the annulus 11, together with the cross shaft 10 will also tend to turn oppositely to the gear 18 by the action of the latter on the gear 16', and that of the gear 12 on the gear 13.

If opposite motion were permitted between the gear 13 and cross shaft 10, there would be no power transmitted to the gear whenever there was no appreciable resistance met with between them. Hence the provision of the automatically clutching devices 27, by means of which such backlash is prevented.

If, now, the grooved pin 36 is made wholly to close the cross-passage 41, then the liquid in the jacket 34 will wholly prevent relative rotation of the spur gears 32, 33, and the parts 11, 10, 13, 8, 5 and 4 will all be made to turn on the axis 3, 8, 5 as a rigid whole; thereby communicating the speed of the engine unchanged to the driven shaft 4. By partially opening the cross-passage 41, a relative rotation is permitted between the gears 32, 33, and consequently a lessened speed is transmitted to the gear 13 and hence to the shafts 5, 4.

For reversing the rear wheels, the member 20 is shifted to disengage the gear 16' from its clutching engagement with the shaft 10, first to neutral, and then to put the gear 16 into clutch with the shaft 10; simultaneously putting the pin 30 into one of the recesses 29 in the gear case 1. This causes the gears 18, 16, 12 and 13 to impart a positive but slow speed reverse motion to the shafts 5 and 4 and thence to the rear wheels.

In order that there may be no resistance between the gears 32, 33 when the car is backed, the reversing lever 26 is connected with the speed control lever 39 by means of a rod 61 which is slidable in a hole in the lever 39, but is provided with a shoulder 62 so disposed that when the reverse lever 26 is swung toward the left for reversal, the shoulder 62 meets and presses the lever 39 in the same direction and thereby causes the grooved pin 36 to permit free circulation of the liquid in the jacket, and hence an unimpeded relative rotation of the gears 32, 33.

In the modification of the last-described resistance device, which is illustrated in Fig. 7, the gears 32, 33 are located entirely separate from the shaft 8 in a housing 65, and connected with the shaft 8 by a spur gear 66 fixed on the shaft and a pinion 67 on the shaft of one of the gears, as 33. A further change consists in locating a reservoir 69 between the housing and one of the passages 35, in which reservoir is a spring pressed plunger 70 for taking up any loss of the liquid through leakage.

The advantage in having the spur gear 33 connected to the shaft 8 by multiplying gearing 66, 67, is that the increased speed of the gears 32, 33 and the resistance of the liquid render their effect upon the gear 13 much more pronounced, and any leakage past the gears less objectionable.

In Fig. 1ª is illustrated an arrangement whereby a single lever 71 is enabled to operate both levers 26 and 39. This is done by giving the lever 71 a ball-and-socket fulcrum 72, and each of the connecting rods 61, 73 a transversely slotted post 74. By swinging the lever 71 laterally to engage either slot 75 and then swinging it fore and aft, the levers 26 and 39 are easily actuated.

In Fig. 1ᵇ is illustrated another form of the variable resistance comprising a spur gear 66 fixed on the shaft 8, a pinion 67 meshing therewith, a drum 80 rigid with the pinion, a friction band 81 surrounding the drum, and a push rod 82 having angularly disposed jaws 83 engaging pins 84 projecting from the ends of the band 81, and adapted when the rod is pushed inward by means of the collar 37, to draw the ends of the band 81 toward each other and thereby to increase the friction between the band and the drum 80. The pinion 67 being so much smaller than the gear 66, a slight amount of friction on the drum is greatly multiplied in causing the shaft 8 and gear 13 to turn in unison and in any other desired ratio.

What I claim as my invention is:

1. In a speed change gear, a driving shaft, a shaft in alinement therewith, a cross shaft at right angles to the second named shaft and revolving therewith in a plane transverse thereto but rotatable on its own axis, means for transmitting rotary motion from said driving shaft to said cross shaft, a gear supported to revolve with the second-named shaft and rotated by said cross shaft, an annulus terminally supporting said cross shaft and, with the latter, adapted to rotate about the axis of said driving shaft, means controlling said rotation, and means providing a resistance variable at will between the rotation of said annulus and that of said gear.

2. In a speed change gear, a driving shaft, a shaft in alinement therewith, a cross shaft at right angles to the second-named shaft and revolving therewith in a plane transverse thereto but rotatable on its own axis, means for transmitting rotary motion from said driving shaft and to said cross shaft, a gear supported to turn with the second-named shaft and rotated by said cross shaft, a member terminally supporting said cross shaft and with the latter adapted to rotate about the axis of said driving shaft, means providing a resistance variable at will between the rotation of said member and that of said gear, and means for automatically stopping the rotation of said member in one direction but permitting it in the opposite direction.

3. In a speed change gear, a drive shaft, a driven shaft in alinement therewith, a shaft between the drive shaft and driven shaft and in alinement therewith, a sleeve on the third-named shaft and driven by the drive shaft, a bevel gear turning with said sleeve, a cross shaft at right angles to the third named shaft and revolving therewith in a plane transverse thereto but rotatable on its own axis, two bevel gears loose on the cross shaft and meshing with the bevel gear aforesaid, means for clutching either of said two gears to the cross shaft, a bevel gear fixed on the cross shaft, a bevel gear meshing with the last-named gear and rigid with said driven shaft, and a variable resistance between the third-named shaft and the gear which is rigid with the driven shaft.

4. In a speed change gear, a drive shaft, a driven shaft, a third shaft between the same and in alinement therewith, a sleeve loose on the third shaft but turned by the driving shaft, a bevel gear fixed on said sleeve, a cross shaft at right angles to the third shaft and revolving therewith in a plane transverse thereto but rotatable on its own axis, an annulus terminally supporting the cross shaft, two bevel gears loose on the cross shaft and meshing with the first named gear, means for clutching either of said two gears to the cross shaft, a fourth gear fixed on the cross shaft, a bevel gear turning on the third shaft but rigid with the driven shaft and meshing with the fourth gear, variable resistance between the fourth gear and the third shaft, said two bevel gears being adapted for communicating direct and reverse motion respectively, a stationary member closely surrounding said annulus, and means for clutching said annulus to said stationary member simultaneously with clutching the reverse gear with the cross shaft.

5. In a speed change gear, a driving shaft, a driven shaft, a third shaft intermediate thereof and in alinement therewith, a sleeve loose on the third shaft and driven by said driving shaft, a bevel gear rigid with said sleeve, a cross shaft at right angles to the third shaft and revolving therewith in a plane transverse thereto but rotatable on its own axis, two bevel gears loose on said cross shaft and meshing with the first bevel gear, a bevel gear turning on the third shaft but rigid with said driven shaft, a bevel gear fixed upon said cross shaft and meshing with the last-named gear, means for clutching the said two bevel gears on said cross shaft thereto, each being adapted to be clutched as the other is unclutched, means for locking said cross shaft against rotation about said shafts, a variable resistance between the third shaft and the gear thereon, and means controlling said resistance.

6. In a change speed gear mechanism, the combination of a terminally supported shaft, two gears loose thereon, one near each end, a cross shaft at right angles to said shaft and revolving therewith in a plane transverse thereto but rotatable on its own axis, two small gears interchangeably locked with said cross shaft and in permanent mesh with one of the first-named gears, a fifth gear mounted on said cross shaft in permanent mesh with the other of the two first-named gears, a variable resistance element between the first-named shaft and one of the first-named gears, and means for varying said resistance from full to zero.

In testimony that I claim the foregoing invention, I have hereunto set my hand this May, 1925.

ALBERT BURDETT CLARK.